United States Patent [19]

Nakamura et al.

[11] Patent Number: 4,745,506
[45] Date of Patent: May 17, 1988

[54] MAGNETIC HEAD FOR PERPENDICULAR MAGNETIC RECORDING AND REPRODUCTION

[75] Inventors: Kazuo Nakamura, Toyonaka; Seishi Sasaki, Nishinomiya; Ken Takahashi, Suita; Hiroshi Yohda, Hirakata; Nobuyuki Kaminaka, Neyagawa, all of Japan

[73] Assignee: Matsushita Electric Industrial Co., Ltd., Osaka, Japan

[21] Appl. No.: 89,945

[22] Filed: Aug. 26, 1987

Related U.S. Application Data

[63] Continuation of Ser. No. 758,547, Jul. 24, 1985, abandoned.

[30] Foreign Application Priority Data

Aug. 1, 1984 [JP] Japan .................. 59-161814
Sep. 27, 1984 [JP] Japan .................. 59-202503
Dec. 26, 1984 [JP] Japan .................. 59-277929

[51] Int. Cl.$^4$ .............. G11B 5/147; G11B 5/187; G11B 5/23
[52] U.S. Cl. ................... 360/123; 360/119; 360/122; 360/126
[58] Field of Search .............. 360/123, 126, 127, 119, 360/122, 125

[56] References Cited

U.S. PATENT DOCUMENTS 3,987,487 10/1976 Berger .......................... 360/127
4,402,027 8/1983 Nakamura et al. ............ 360/123
4,423,450 12/1983 Hamilton ..................... 360/123
4,546,398 10/1985 Toda et al. .................. 360/123
4,575,777 3/1986 Hosokawa .................... 360/123

FOREIGN PATENT DOCUMENTS 56-44115 5/1981 Japan .
56-80814 8/1981 Japan .
57-111817 1/1982 Japan .

OTHER PUBLICATIONS

Iwasaki et al., "The . . . Head", IEEE Transactions on Magnetics, vol. Mag-14, No. 5, Sep. 1978.
Toda et al., "A . . . Recording", IEEE Transactions on Magnetics, vol. Mag-18, No. 6, Nov. 1982.

Primary Examiner—Robert S. Tupper
Attorney, Agent, or Firm—Stevens, Davis, Miller & Mosher

[57] ABSTRACT

A perpendicular magnetic head of high recording and reproducing efficiency which integrally incorporates a step-up transformer. A main pole for picking up a reproduce magnetic flux from a recording medium and applying recording magnetic field thereto is formed of a magnetic thin film. A signal winding formed of a thin film is disposed in the immediate vicinity of the forward end of the main pole so as to have a high conversion sensitivity per turn with respect to the reproduce magnetic flux from the recording medium. The signal winding which itself constitutes a closed circuit interlinks a magnetic path of the step-up transformer, thereby forming a primary winding of the transformer. A secondary winding from which head output is taken out is wound in the magnetic path of the transformer.

23 Claims, 14 Drawing Sheets

MAGNETIC HEAD FOR PERPENDICULAR MAGNETIC RECORDING AND REPRODUCTION

This application is a continuation of application Ser. No. 758,547, filed July 24, 1985, now abandoned.

BACKGROUND OF THE INVENTION

This invention relates to a magnetic head for perpendicular magnetic recording and reproduction. Perpendicular magnetic recording enables signals to be recorded with much higher density than the conventional longitudinal magnetic recording. As a head for recording and reproducing such perpendicular magnetic signals, the following heads have been proposed. FIG. 1 shows a first example of such heads, namely, an auxiliary-pole-driven perpendicular magnetic head in which a main pole 1 and an auxiliary pole 3 with a winding 2 oppose each other with a medium 4 therebetween. A second example, namely, a main-pole-driven perpendicular magnetic head which makes improvements on the first example is shown in FIG. 2, and enables recording and reproduction from one side of the medium.

Both of these heads signals are recorded on a medium by applying a recording current to the winding 2, and are reproduced by virtue of a voltage induced in the coil by the magnetized medium, and it is known that the closer the winding is positioned to the medium, the higher the efficiency is.

A head of thin film structure is effective in providing a coil at a position as close as possible to a medium in a main-pole-driven perpendicular magnetic head. FIG. 3 shows a third example having this structure.

The main pole 1 formed of a magnetic thin film, a thin film coil 6 and a return yoke 7 formed of a magnetic thin film are laid on top of one another in this order on a non-magnetic substrate 5. An insulation layer (not shown) is formed between the films. This structure can reduce the entire size of the head, especially the dimension of $L_1$ shown in FIG. 3, of a thin film head of this structure, and thus can provide a coil with high efficiency. A head which has a coil of approximately 10 turns of winding and in which the dimension $L_1$ is approximately 100 μm has been realized with this structure.

Furthermore, a fourth example has been proposed in which the winding is brought even closer to the medium, as is shown in FIG. 4.

The thin film coil 6 is formed on a magnetic substrate 8, to which the main pole 1 held by a non-magnetic substrate 9 is bonded. This structure makes the distance between the coil and the medium $L_2$ shorter than $L_1$, and makes it possible to obtain a head with higher efficiency.

The above-described perpendicular heads which have hitherto been proposed will now be compared in the following.

In the first and second examples, a coil can have several tens to several hundred of turns, but since the diameter of the wire is several tens μm, the entire dimension of the coil becomes more than several hundreds of μm, this makes the miniaturization of a coil unattainable, thus placing a limit upon the efficiency of the head.

In the third and fourth examples which use a coil of several μm both in width and thickness, it is possible to realize a highly efficient head with a coil of small dimension and hence the head itself can be kept small. It is contemplated to realize a large number of turns as in the first and second examples while employing a thin-film structure as in the third and fourth examples.

FIGS. 5a and 5b show the flows of the magnetic flux of the heads shown in FIGS. 3 and 4, respectively. The magnetic flux flows in the manner indicated by the arrows and it is found that there are magnetic lines of force which leak without interlinking the entire coil. It is necessary to enlarge the dimensions A in FIG. 5a and B in FIG. 5b in order to increase the number of turns of the thin film coils. However, the more distant the coil becomes from the main pole, the lower becomes the number of flux interlinkage. Accordingly, the realization of a coil constructed in the manner as described above and having several tens to several hundred turns will not go far toward heightening of the absolute output. On the other hand, if a multi-layer thin film coil (e.g. 10 turns × 10 layers) is realized, the head will be highly efficient, but this may prove impractical since the manufacturing process becomes considerably complicated to be impractical.

To sum up, according to the first and second examples a head of low efficiency with a large number of coil turns and according to the third and fourth examples a head of high efficiency but with a small number of coil turns, respectively, are the only forms realizable, and with respect to head output, which is the most important factor from the practical point of view, none of them are satisfactory.

SUMMARY OF THE INVENTION

Accordingly, it is an object of the invention to provide a perpendicular magnetic head having a high head output.

To realize a high output perpendicular head, this invention is aimed at obtaining a head structure having the equivalent of a high efficiency with a large number of windings by detecting a signal magnetic field with high efficiency (in a state in which the induced electromotive force per turn is great) by means of a thin film coil having at most several turns, the coil being used for a signal winding which is directly connected to a main pole and arranged close to a recording medium, and by stepping up the signal by means of a transformer disposed close to the coil and coupled therewith.

To achieve this aim, a perpendicular magnetic head is composed of a main pole, a first magnetic path including the main pole and a medium, a first thin film coil which interlinks the first magnetic path and which itself constitutes a closed circuit, a second magnetic path which interlinks the first thin film coil, and a second coil which interlinks with the second magnetic path and has more turns than the first thin film coil.

With this structure, the output current which flows into the first thin film coil is taken out to the second coil as a boosted output, and, in addition, there is no possibility of lowering the efficiency of the main pole.

The above and other objects, features and advantages of the present invention will become clear from the following description of the preferred embodiments thereof, taken in conjunction with the accompanying drawings.

DETAILED DESCRIPTION OF THE PREFERRED EMBODIMENT

Figure 1:
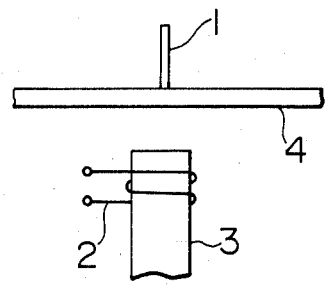
FIG. 1 is a side elevational view of an example of a conventional perpendicular magnetic head recording medium system.
Figure 2:
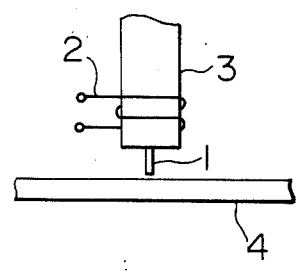
FIG. 2 is a side elevational view of another example of a conventional perpendicular magnetic head recording medium system.
Figure 3:
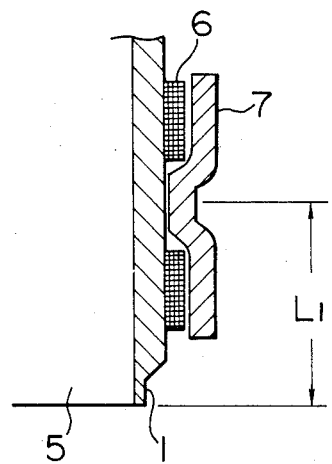
FIG. 3 is a sectional view of an example of a conventional perpendicular magnetic head with improved head efficiency.
Figure 4:
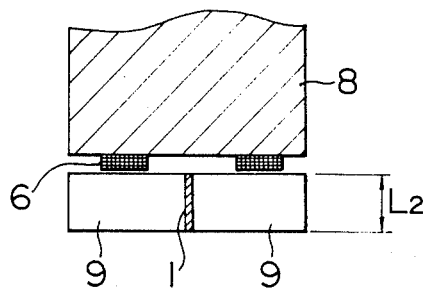
FIG. 4 is a sectional view of another example of a conventional perpendicular magnetic head with improved head efficiency.
Figure 5A:
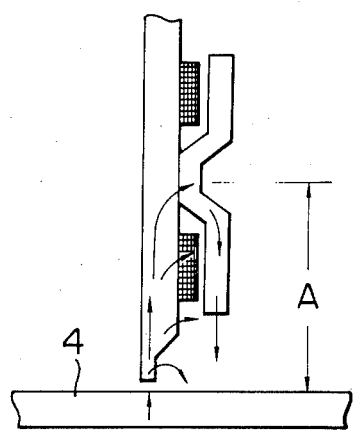
FIGS. 5a and 5b are sectional views of the perpendicular magnetic heads shown in FIGS. 3 and 4, respectively, illustrating the flows of the reproduced magnetic flux.
Figure 5B:
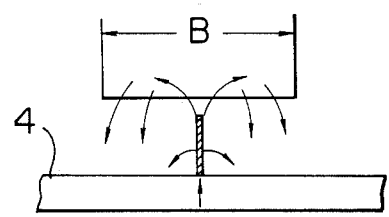
Figure 6A:
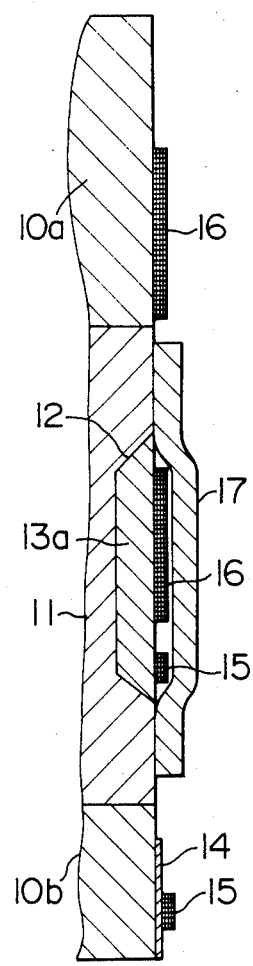
FIGS. 6a and 6b are a sectional view and a plan view, respectively, of an embodiment of the invention.
Figure 6B:
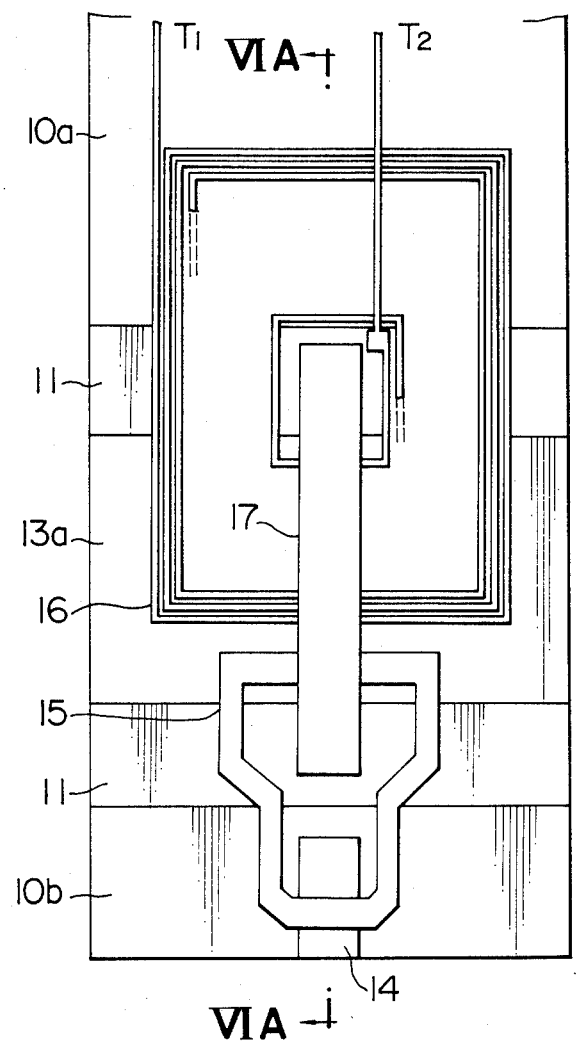

A first embodiment of the invention is shown in FIGS. 6a and 6b. FIG. 6a is a sectional view of the embodiment shown in FIG. 6b taken along the line VIa—VIa.

The reference numerals 10a and 10b represent non-magnetic substrates and 11 a magnetic substrate, the three of which are bonded together with an adhesive, bonding glass, or the like. The magnetic substrate 11 is provided with a groove 12 which is filled with a non-magnetic material 13a. A main pole 14 is prepared by covering a composite substrate of the above-described structure with a magnetic thin film and forming a pattern thereon by photo etching. A first thin film coil 15 and a second thin film coil 16 are formed of an electroconductive material by using a similar technique. Terminals $T_1$, $T_2$ are provided on the second thin film coil 16 by a known technique on a thin film head. The first thin film coil 15 is a one-turn coil which itself constitutes a closed circuit. A magnetic thin film 17 is formed by a similar technique to constitute a part of the magnetic circuit path which interlinks both of the first and second thin film coils 15, 16.

Figure 7:
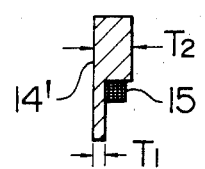
FIG. 7 is a sectional view of the main pole in accordance with the invention.

This magnetic thin film 17 is magnetically coupled with the magnetic substrate 11 on both sides of the layer of non-magnetic material 13, and constitutes a closed magnetic circuit in combination with the magnetic substrate 11. The magnetic thin film 17 in the embodiment shown in FIG. 6a has a strip-like shape but it may be formed such as to cover the entire surface of the second thin film coil 16. An insulation film (not shown) is essential between the magnetic thin film and the thin film coils. Efficiency is heightened even more by providing the main pole 14 with a section such as is shown in FIG. 7 in place of a simple strip-like shape. The dimension of $T_1$ is preferably 0.1 to 0.5 $\mu$m and that of $T_2$ is preferably 1 to several $\mu$m.

The operation of the first embodiment having the above-described structure will be described in the following. This head is effective in reproducing a perpendicular magnetic signal recorded on what is called a perpendicular recording medium. The magnetic flux generated from a perpendicular magnetization is collected by the main pole 14. The magnetic flux $\phi$ changes with the lapse of time due to the relative movement of the medium and the head, and a regenerated voltage $V_1 = -d\phi/dt$ is induced to the thin film coil 15 which interlinks with the main pole 13. Since this coil itself constitutes a closed circuit, a current flows to this circuit. The current flowing in this circuit induces magnetic flux to the closed circuit consisting of the magnetic substrate 11 and the magnetic thin film 17. If the number of turns of the second thin film 16 interlinking the closed circuit is assumed to be N, the voltage $N \times V_1$ is generated in the circuit. Thus the portion serves as a transformer for stepping up the voltage. This voltage is equivalent to that produced by a coil having "N" number of turns which might be provided at the portion where the main pole 14 and the first thin film coil 15 interlink. In this way an extremely efficient perpendicular magnetic reproducing head is realized.

Figure 8:
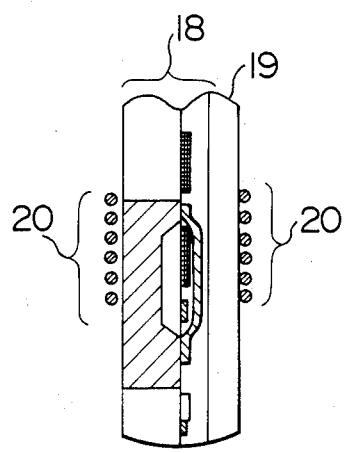
FIG. 8 is a modification of the embodiment shown in FIGS. 6a and 6b with an auxiliary winding means for recording provided.

FIG. 8 shows a modification of the above embodiment, in which a recording coil is provided around this head. The reference numeral 18 denotes the head shown in FIG. 6a and 19 a cover of a magnetic material such as ferrite or a non-magnetic material such as glass. A recording coil 20 is provided around the entire surface of the head. When a one-turn thin film coil is insufficient for a recording magnetomotive force, it is effective to provide separately a wound wire for recording.

In the above-described embodiments, the number of turns of the coil interlinking the first magnetic path is one. However, if the number of turns of the first coil interlinking the first magnetic path is $N_1$, that of the coil interlinking the second magnetic path is $N_2$, and that of the second coil interlinking the second magnetic path is $N_3$, this is generally equivalent to provision of a coil of $[(N_1 \times N_3)/N_2]$ turns at the forward end of the main pole. The choice of a large value of $N_1/N$ ($N_2 = 1$ is suitable for practical use) further heightens the effects of the invention. This situation is the same with the following embodiments.

Figure 9:
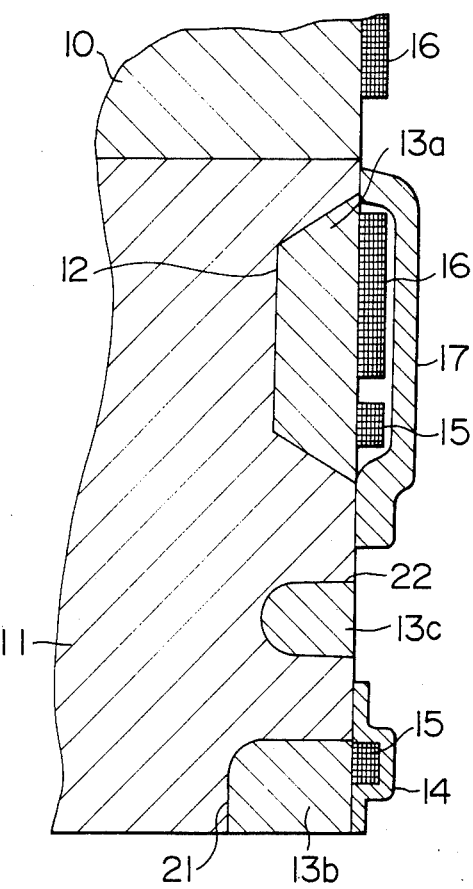
FIG. 9 is a sectional view of another embodiment of the invention.

FIG. 9 shows a second embodiment of the invention. This has a structure similar to the first embodiment.

Like reference numerals denote like elements in FIGS. 6a, 6b and 9. The magnetic substrate 11 is exposed to the sliding surface of the medium so as to constitute a return yoke for returning to the medium signal flux which interlinks the first thin film coil 15 through the main pole 14. A groove 21 filed with a non-magnetic material 13b is provided on the substrate surface facing the sliding surface of the medium. In order to prevent generation of a dip point on the wavelength characteristics due to gap loss, it is necessary to form the groove 21 with a length which is greater, to an adequate degree, than the wavelength to be reproduced. The first thin film coil 15 is formed under the main pole 14 so as to interlink the closed circuit consisting of the main pole 14 and the return yoke. A groove 22 provided on the upper portion of the main pole 14 is filled with a non-magnetic material 13c so as to prevent the signal flux picked up from the main pole 14 from flowing into the closed circuit where the second thin film coil 16 exists and to return it efficiently to the medium. In short, two closed circuits and grooves for separating the circuits are provided in this embodiment, thereby making the structure more effective than that of the first embodiment.

Figure 10A:
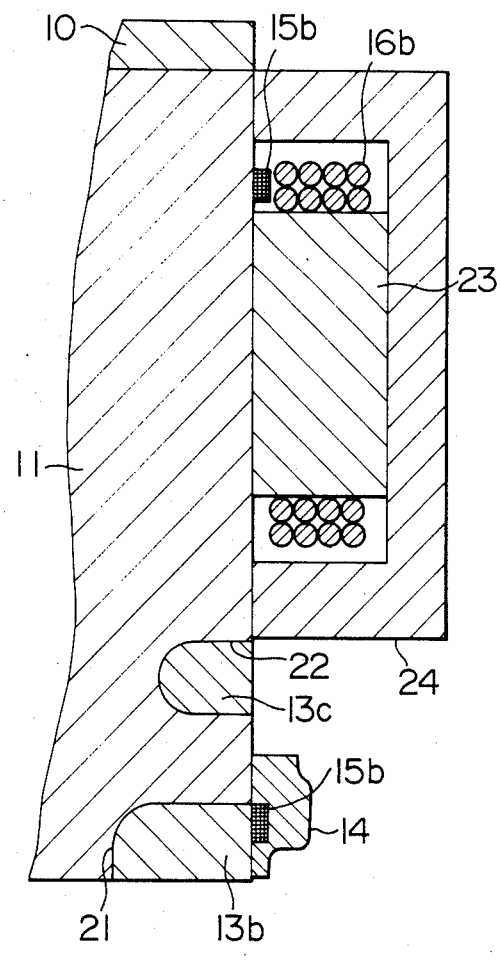
FIGS. 10a and 10b are a sectional view and a plan view of the main part, respectively, of still another embodiment of the invention.
Figure 10B:
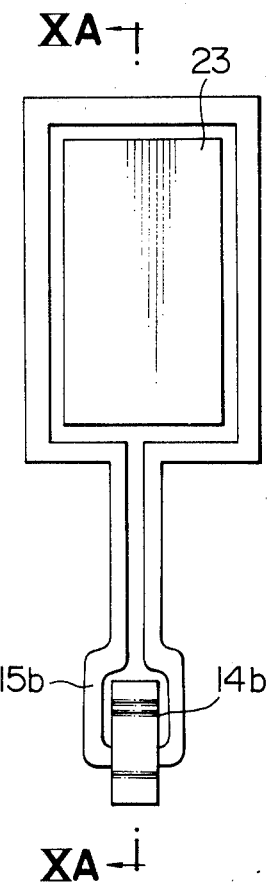

Referring next to FIGS. 10a and 10b, a third embodiment is shown, wherein FIG. 10b is a plan view of the main portion of the embodiment and FIG. 10a is a sectional view of the embodiment taken along the line Xa—Xa in FIG. 10b. This embodiment is similar to the second embodiment, except in that the efficiency of the transformer portion for stepping up the voltage is heightened. On the substrate of the structure shown in FIG. 9, from which the groove 12 and the non-magnetic material 13a are omitted, is formed a one-turn thin film coil 15b having the configuration shown in FIG. 10b, and a columnar center pole 23 formed of a magnetic material such as ferrite is inserted into the coil 15b and adhered thereto. A wire 16b is wound around the center pole 23 in advance. The center pole 23 is covered by a box-shaped return core 24 so as to surround the periphery thereof, whereby a closed circuit is formed. The wire wound around the center pole 23 may be a copper wire, but a thin film coil is more effective in order to provide a finer multi-turn winding. In addition, a part of the main pole 14b can be made thicker than that shown in FIG. 9, thereby heightening the efficiency.

Figure 11:
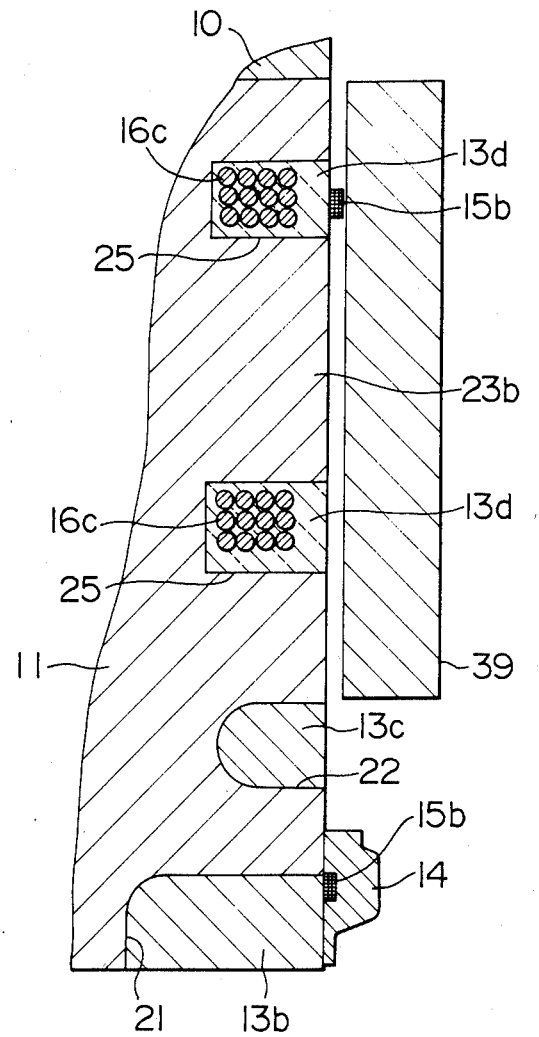
FIG. 11 is a sectional view of a further embodiment of the invention.

FIG. 11 shows a fourth embodiment. The structure of the embodiment is the same as that of the third embodiment except that the transformer is formed on the substrate side. A groove 25 is formed on the magnetic substrate 11, leaving a columnar center pole 23b. A wire 16c is wound around the center pole 23b, and is embedded in the material 13d such as glass. A one-turn thin film coil 15b of the same configuration as that shown in FIG. 10b is formed on the magnetic substrate 11 so as to surround the center pole 23b. A closed circuit is formed by adhering a magnetic material 39 such as ferrite to the thin film coil 15b or covering the thin film coil 15b with the magnetic material 39. This embodiment is more easily manufactured than the third embodiment.

Figure 12A:
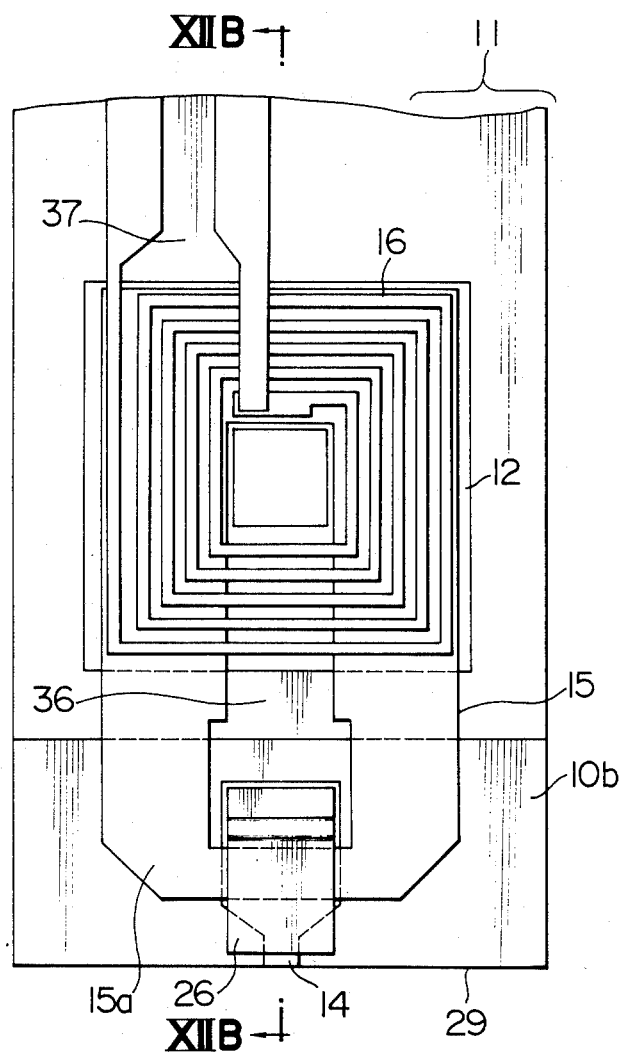
FIGS. 12a and 12b are a plan view and a sectional view, respectively, of a still further embodiment of the invention.
Figure 12B:
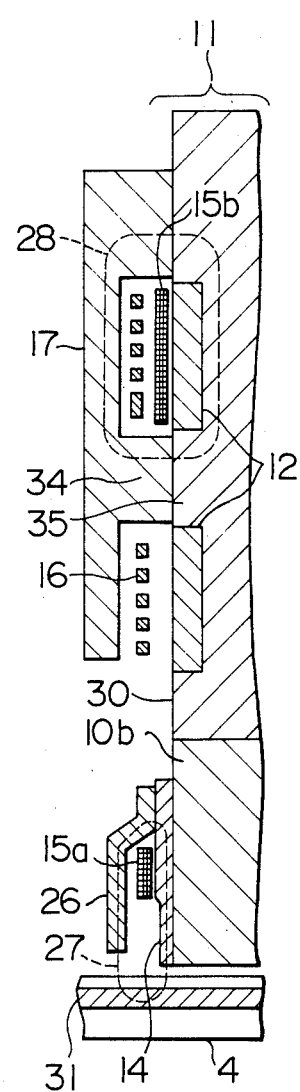
Figure 13:
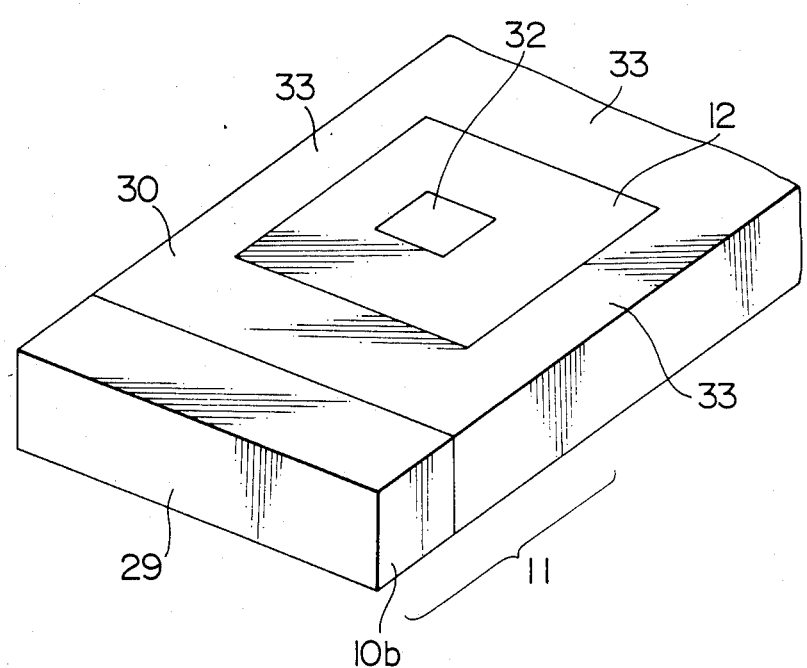
FIG. 13 is a perspective view of the substrate of the embodiment shown in FIG. 12.

A fifth embodiment is shown in FIGS. 12a, and 12b. The reference numeral 11 denotes the magnetic substrate, 30 a thin film forming surface, and 29 a recording medium facing surface. The substrate 11 has a first non-magnetic material filled portion 10b at the forward end portion, and a second non-magnetic material filled portion 12 having the configuration of a closed groove placed on the thin film forming surface 30 backward of the first non-magnetic material filled portion 10b. FIG. 13 shows a perspective view of the substrate 11.

The reference numeral 14 in FIGS. 12a and 12b represents the main pole formed of a magnetic thin film, and in this main pole 14 the thickness of a portion backward of a first coil 15a is preferably greater than that of the forward portion. The reference numeral 26 denotes a return yoke formed of a magnetic thin film, the backward portion thereof is magnetically coupled with the rear end portion of the main pole 14, and the forward end portion extends to the vicinity of the medium facing surface 29. The main pole 14 and the return yoke constitute a first closed circuit 27 together with a soft magnetic material 31 in the recording medium 4.

A closure yoke 17 formed of a magnetic block or a magnetic thin film magnetically couples the inner domain (32 in FIG. 13) with the outer domain (32 in FIG. 13), thereby constructing the core of a shell-type transformer together with the magnetic substrate 11. The portions indicated by the numerals 34, 35 are the magnetic core portions of the shell-type transformer around which the primary and the secondary coils are to be wound, and the numeral 28 shows a typical magnetic path (a second closed circuit) thereof.

The reference numeral 15 in FIG. 12a denotes the first thin film coil which itself forms a one-turn closed path. The forward portion 15a of the coil 15 interlinks the first closed circuit 27 as a signal winding in relation to the main pole, and the backward portion 15b interlinks the second closed circuit 28 as a primary winding of the transformer.

The second thin film coil 16 interlinks the second closed circuit 28 as a secondary winding of the transformer.

The first coil 15 and the second coil 16 are disposed in such a manner that the rear portion 15b of the first coil and the second coil 16 are coaxially wound above the second non-magnetic material filled portion 12.

The above-disclosed closure yoke 17 is omitted in FIG. 12a.

It goes without saying that the inner domain 32 and the outer domain 33 of the second non-magnetic material filled portion 12 should be coupled without passing through the inner portions of the first and second coils (the portion indicated by the numerals 36, 37 in FIG. 12a). This is because the closed magnetic path passing the portion 36 does not interlink the first coil 15 and the magnetic path passing through the portion 37 misses the interlinkage with one turn of the second coil 16.

Appropriate insulation layers are provided at those portions where insulation is required such as at the portion between the coils.

Although the recording medium 4 in the embodiment is what is called a double-layered medium having a soft magnetic film under a recording film, this does not limit the range of the invention as the invention is also effective for what is called a single-layered medium consisting solely of a recording film. This applies also to the other embodiments.

Figure 14:
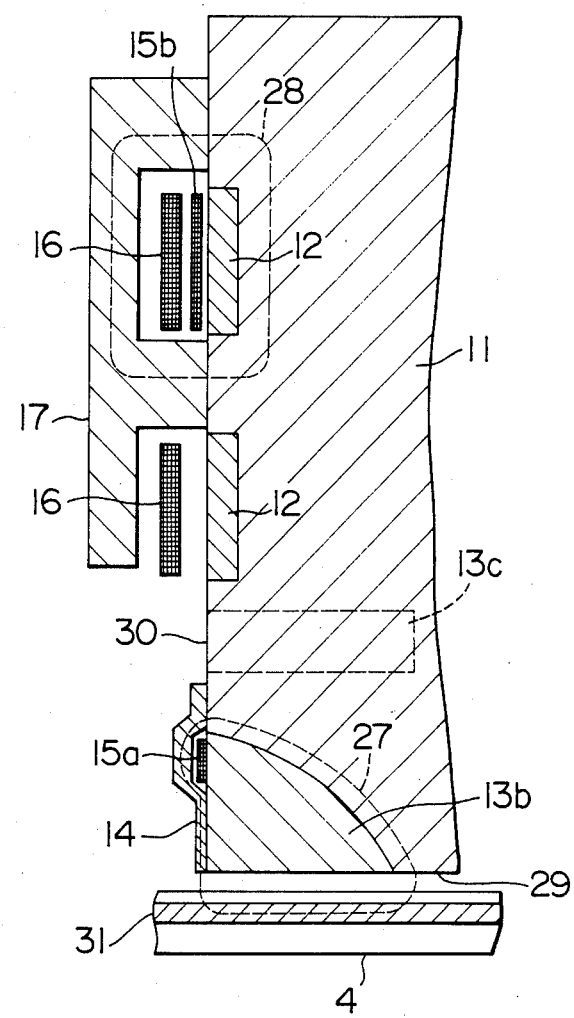
FIG. 14 is a sectional view of a still further embodiment of the invention.

FIG. 14 shows a sixth embodiment of the invention. In this embodiment, the forward end portion of the magnetic substrate 11 also serves as a return yoke with respect to the main pole, for which purpose a first non-magnetic material filled portion 13b is provided on a notched portion including at least one portion of the edge formed by the thin film forming surface 30 and the medium facing surface 29. The rear end portion of the main pole 14 is magnetically coupled with the magnetic material portion of the substrate 11, and the first close path at this time is formed as is indicated by the numeral 27. The forward end portion 15a of the first coil 15 is disposed between the first non-magnetic material filled portion 13b and the main pole 14 such as to interlink the first closed magnetic path 27.

The structure in relation to the transformer portion of the embodiment is the same as that of the fifth embodiment, like reference numerals denoting like elements, and detailed explanation being omitted. Since the first and second closed magnetic paths are connected through the magnetic portion of the substrate 11, they could interfere with each other, but actually in this embodiment no significant interference was experienced. If the size of the entire head is very small, and the first and second closed magnetic paths are remarkably close, a third non-magnetic material filled portion such as indicated by the numeral 13c is preferably provided so as to separate the first and second closed paths.

Figure 15:
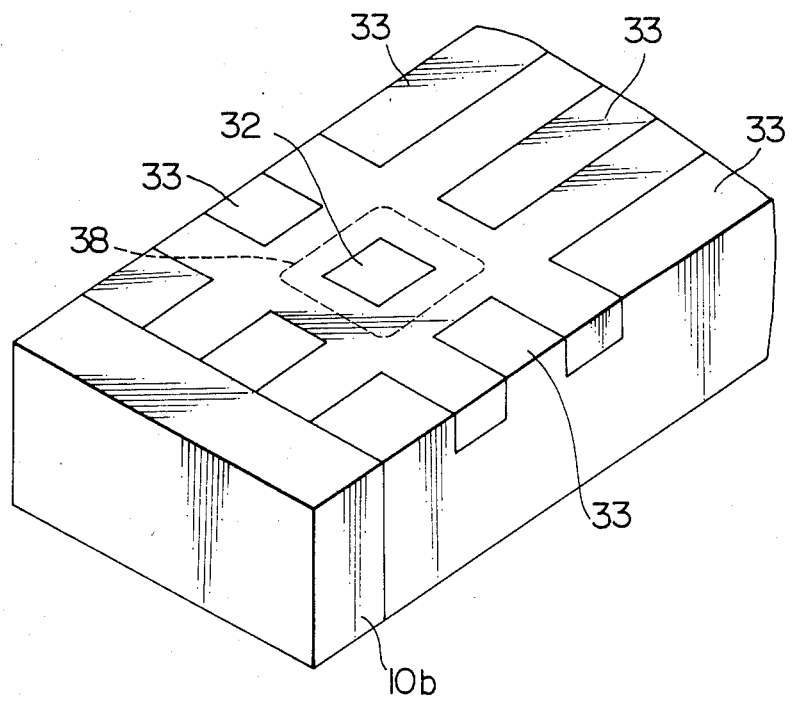
FIG. 15 is a perspective view of the substrate portion of a still further embodiment of the invention.

FIG. 15 is a perspective view of the substrate of a seventh embodiment of the invention having a second non magnetic material filled portion which is improved. The second non-magnetic material filled portion in this embodiment is formed in parallel crosses, as is shown in the Figures, instead of being in the form of a closed groove, whereby the winding range indicated by a broken line 38 corresponds to the non-magnetic material filled portion in the form of a closed groove employed in the fifth and sixth embodiments. This structure facilitates the practical formation of the second non-magnetic material filled portion and heightens mass productivity. Since the effective sectional area of the magnetic path as a core for the shell-type transformers is reduced, degradation of the efficiency might be apprehended. But in fact, there was hardly any difference in efficiency between the transformer in this embodiment and those in the fifth and sixth embodiments. This is considered to be due to the fact that the high efficiency of a shell-type transformer largely depends upon the fact that primary and secondary coils come close to each other and are coaxially wound.

Figure 16A:
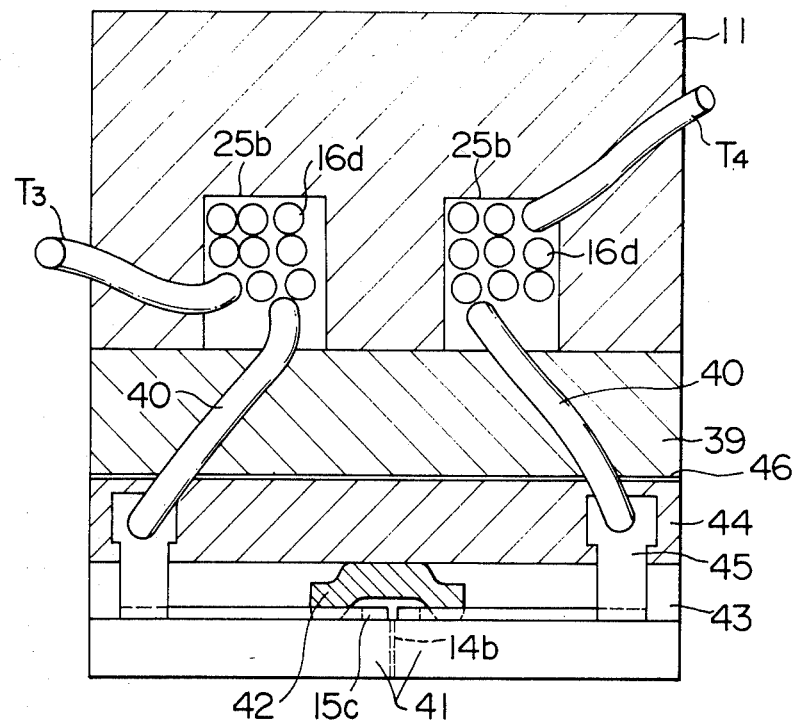
FIGS. 16a and 16b are a sectional view and a plan view, respectively, of a still further embodiment of the invention.
Figure 16B:
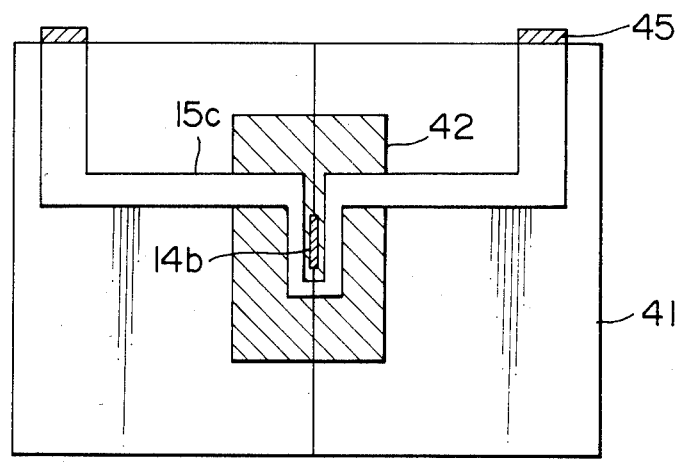

An eighth embodiment is shown in FIGS. 16a and 16b, wherein FIG. 16b shows the embodiment as viewed from below.

A groove 25b is provided around the portion to be left as a columnar center pole on the magnetic substrate 11. A wire 16d is wound into multiple turns in the groove 25b and the symbols $T_3$ and $T_4$ denote their electrodes. A wire 40 is wound around the center pole in one turn. A magnetic material 39 is adhered to the substrate 11 so as to cover the groove 25b. The numeral 41 denotes a non-magnetic substrate such as glass and 14b is a main pole interposed between the non-magnetic material 41. A one-turn thin film coil 15c is formed on the upper end surface of the non-magnetic substrate 41 and a magnetic thin film 42 is formed on the thin film coil 15c through an insulation film. The reference numeral 43 represents glass for bonding the non-magnetic substrate 41 with a non-magnetic spacer 44. A terminal formed of an electroconductive thin film 45 is formed on the side surface of the non-magnetic substrate 41 and is connected to the end portion of the one-turn thin film coil 15c which is exposed to the side surface of the non-magnetic substrate 41. The upper portion and the lower portion of the head obtained in this way are bonded with a bonding layer 46 therebetween. The thin film coil terminal 45 and the end portion of the one-turn thin film coil 15c are connected by soldering or the like and constitute a closed circuit. The operation of the embodiment is the same as that in the above-described embodiments. The magnetic thin film 42 and the non-magnetic spacer 44 are provided for the respective purposes of heightening the flux concentrating efficiency of the main pole 14b and of preventing the flux from the main pole 14b from mixing with the closed circuit on the transformer side.

This embodiment allows the depth of the main pole 14b to be made smaller than in the first to fourth embodiments and thereby further improve efficiency.

Figure 17A:
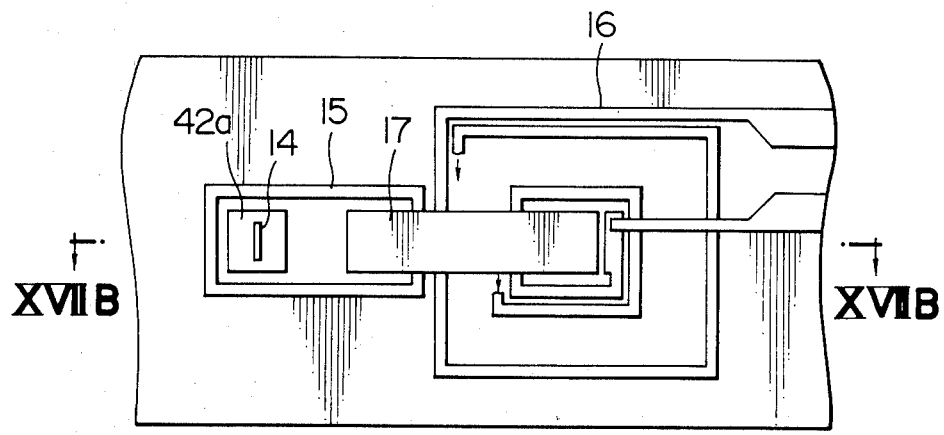
FIGS. 17a and 17b are a plan view and a sectional view, respectively, of a still further embodiment of the invention.
Figure 17B:
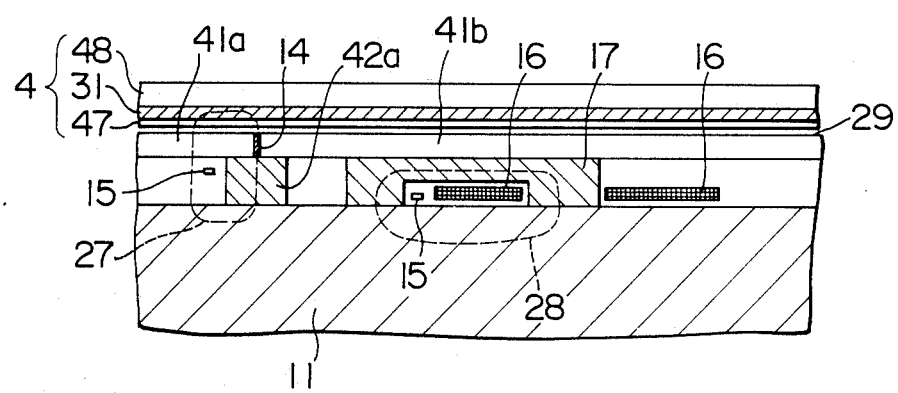

FIGS. 17a and 17b show a ninth embodiment, wherein FIG. 17b is a sectional view of the embodiment taken along the line XVIIb—XVIIb.

The head substrate 11 contains magnetic material at least in the vicinity of the surface, and it may be a magnetic substrate of ferrite or the like or a composite substitute composed of a non-magnetic substrate with a magnetic thin film attached to the surface thereof. A first magnetic thin film 42a is formed on the surface of the head substrate 11 by forming it into a pattern of predetermined form, and the main pole 14 of a magnetic thin film is formed on the first magnetic thin film 42a substantially perpendicularly relative to the first magnetic thin film 42a in such a manner that the main pole 14 is sandwiched between non-magnetic materials 41a, 41b and one end of the magnetic pole 14 is magnetically coupled with the first magnetic thin film 42a and the other end exposed to the medium facing surface 29. The main pole 14, the first magnetic thin film 42a, the head substrate 11 and the soft magnetic layer 31 constitute the first magnetic path 27. The reference numeral 47 denotes a perpendicular magnetic film of Co-Cr or the like, and 48 a base. On the other hand, the second magnetic thin film 17 is disposed in the vicinity of the first magnetic thin film 42a so as to form the second magnetic path 28 which passes the head substrate 11. A first thin film coil 15 which itself constitutes a closed circuit is disposed so as to interlink the second magnetic path 28 and the first magnetic path 27. The second thin film coil 16 is disposed as a secondary winding of the transformer so as to interlink the second magnetic path 28.

Figure 18:
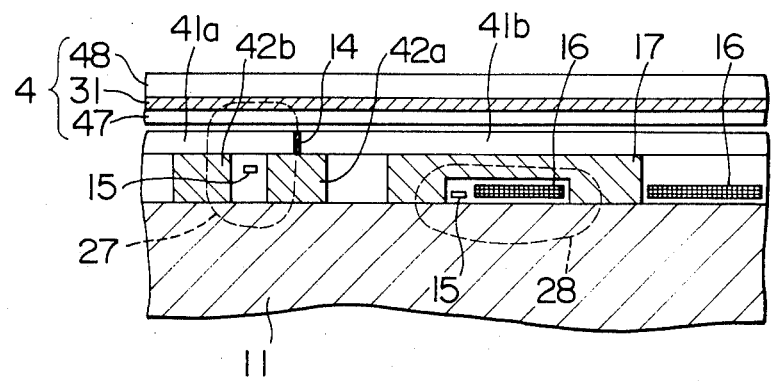
FIG. 18 is a sectional view of a still further embodiment of the invention.

Referring next to FIG. 18 which illustrates a tenth embodiment of the invention, like reference numerals denote like elements in FIGS. 17a, 17b and 18, explanation being omitted here. In this embodiment, the first magnetic thin films 42a, 42b are disposed on both sides of the first thin film coil 15 along the first magnetic path 27, and the main pole 14 is disposed on the first magnetic thin film 42a which is situated inside the first thin film coil 15. This structure enhances the closedness of the first magnetic path 27, and reduces the leakage flux which does not interlink the first thin film coil 15, whereby the detection efficiency is heightened especially when the number of turns $N_1$ of the first thin film coil 15 is large.

Figure 19:
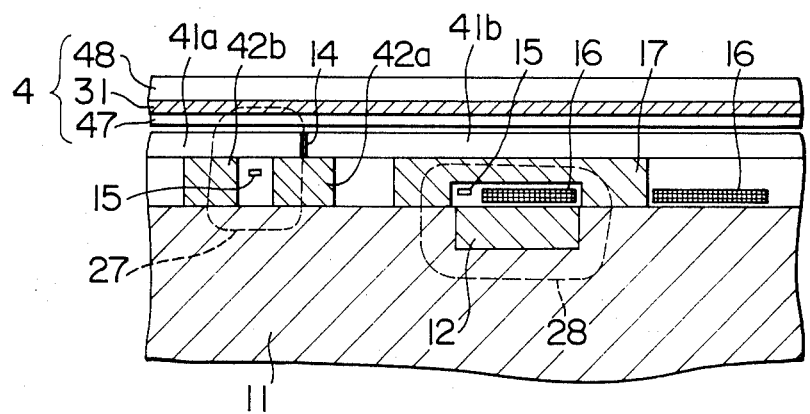
FIG. 19 is a sectional view of a still further embodiment of the invention.

An eleventh embodiment is shown in FIG. 19. Like reference numerals denote like elements in FIGS. 18 and 19, explanation being omitted here. In this embodiment, the groove 12 filled with a non-magnetic material is formed on the substrate under a portion where there is interlinkage between the second magnetic path 28s and the first and/or second coil 15, 16. It is necessary to increase the number of turns $N_3$ of the second thin film coil in order to heighten the step-up rate, whereby the second magnetic path 28 becomes long and narrow so that flux which leaks through the thin film coil portion is disadvantageously increased, efficiency thereby being reduced. The leakage flux can, however, be reduced and the efficiency heightened by forming the groove 12 which is filled with a non-magnetic material on the substrate under the thin film coil portion within the second magnetic path 28, as in this embodiment. In the first magnetic path 27 as well, in the case of increasing the number of turns $N_1$ of the first thin film coil, the detection efficiency is heightened by disposing a groove filled with a non-magnetic material (not shown in FIG. 19) on the substrate under a portion where there is interlinkage between the first magnetic path 27 and the first thin film coil 15.

When the first and second magnetic paths 27, 28 interfere with each other in a small-sized head, another groove filled with a non-magnetic material is preferably formed between the first magnetic thin film 42a and the second magnetic thin film 17 so as to separate both paths 27, 28.

Figure 20:
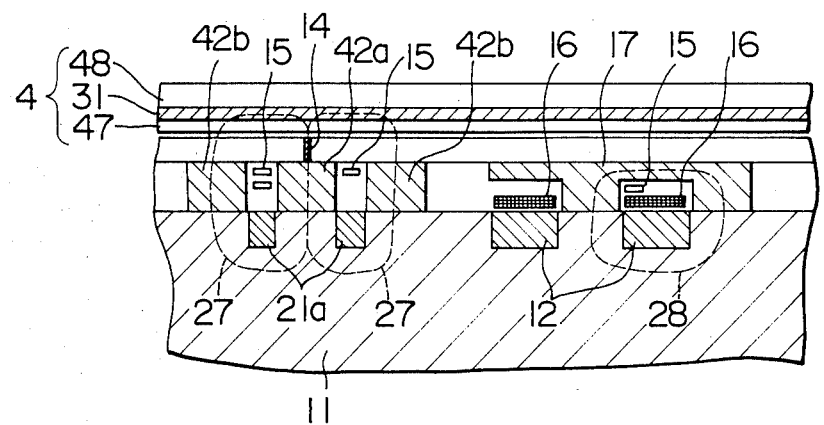
FIG. 20 is a sectional view of a still further embodiment of the invention.
Figure 21:
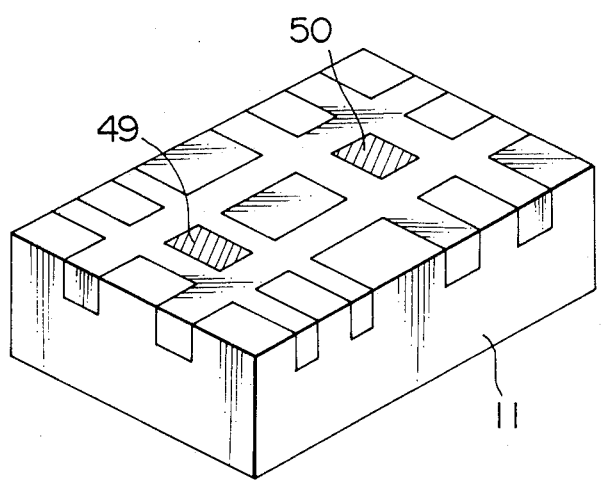
FIG. 21 is a perspective view of the substrate portion of the embodiment shown in FIG. 20.

FIG. 20 shows a twelfth embodiment of the invention. The second magnetic thin film 17 is magnetically coupled with the head substrate 11 at the center portion of the second thin film coil 16 and serves as the core of the transformer. The first thin film coil is wound such that the coupled portion is inside the closed circuit. The second magnetic thin film 17 covers approximately the entire surface of the second thin film coil and a part of the first thin film coil, and constitutes a transformer coupling by being magnetically coupled with the head substrate 11 outside the first and second thin film coils. This structure increases the effective sectional area of the magnetic path, thus realizing a step-up transformer of extremely high conversion efficiency. In the embodiment shown in FIG. 20, the number of turns of the first thin film coil 15 at the main pole portion is two and that of $N_2$ at the transformer portion is one, and therefore the first magnetic path 27 exists on both sides of the main pole 14. A groove 21a is provided on the substrate under each thin magnetic film in order to heighten the efficiency by reducing the leakage of flux at the thin film coil portion. As an example of the formation of such a groove, the head substrate is shown in FIG. 21. Two substantially parallel grooves and four grooves which are substantially orthogonal relative thereto are formed in parallel crosses on the substrate and after being filled with non-magnetic materials their surfaces are finished flush with each other. The first magnetic thin film 42a and the main pole 14 are disposed within a hatched portion 49 and the second thin film coil 16 is formed above the hatched portion 50 with the grooves around its periphery, the hatched portion 50 serving as the core of the transformer.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A perpendicular magnetic recording head for use with a double-layered perpendicular magnetic recording medium having a high-permeability backing layer, said magnetic recording head comprising:

a magnetic thin film pole which is disposed substantially perpendicular to an operative surface of the head, said operative surface being a surface which in operation faces said recording medium, said magnetic thin film pole including one edge exposed to said operative surface;

a high permeability flux return yoke means having at least two end portions, one end portion thereof being magnetically coupled to an end portion of said magnetic thin film pole which is most remote from said operative surface, and another end portion thereof being exposed to said operative surface, said return yoke means and said magnetic thin film pole forming a first magnetic path which is substantially magnetically open;

a non-magnetic separating means located between a portion of said magnetic thin film pole and a portion of said return yoke means, with a portion of said separating means being exposed to said operative surface, said separating means being provided so as to retain said first magnetic path to be magnetically open;

a transformer core means comprising a first high-permeability transformer core means and a second high-permeability transformer core means which are magnetically coupled at least at two portions so as to form a second magnetic path which is substantially a closed magnetic circuit;

a first thin film coil which is disposed substantially parallel to said magnetic thin film pole, and which itself constitutes a closed electric circuit, a portion of said first coil encompassing said end portion of the magnetic thin film pole to which said return yoke means is coupled so as to form an electromagnetic coupling with said first magnetic path, another portion of said first coil encompassing one of said portions of the transformer core means which are magnetically coupled so as to form an electromagnetic coupling with said second magnetic path; and a second coil which is electromagnetically coupled with said second magnetic path, said second coil having a number of turns which is larger than a number of turns of said first thin film coil in relation to said second magnetic path, said second coil being adapted to provide an output from said head.

2. A perpendicular magnetic recording head according to claim 1, wherein a number of turns N1 of said first thin film coil which couples with said first magnetic path is equal to or greater than a number of turns N2 of said first thin film coil which couples with said second magnetic path.

3. A perpendicular magnetic recording head according to claim 2, wherein N1=N2=1.

4. A perpendicular magnetic recording head according to claim 1, wherein said second coil is formed of a thin film disposed in a plane substantially parallel to said magnetic thin film pole.

5. A perpendicular magnetic recording head according to claim 1, wherein said first coil and said second coil are wound coaxially in relation to said second magnetic path.

6. A perpendicular magnetic recording head according to claim 1, wherein said return yoke means is formed of a magnetic thin film.

7. A perpendicular magnetic recording head according to claim 1, wherein said second transformer core means is formed of a magnetic thin film.

8. A perpendicular magnetic recording head according to claim 1, further comprising a magnetic substrate having a substantially planar substrate surface which is disposed substantially parallel to a plane of said magnetic thin film pole.

9. A perpendicular magnetic recording head according to claim 8, wherein said return yoke means is formed of a portion of said magnetic substrate, and said separating means is formed of a non-magnetic material molded in said magnetic substrate.

10. A perpendicular magnetic recording head according to claim 8, wherein said first transformer core means is formed of a portion of said magnetic substrate.

11. A perpendicular magnetic recording head according to claim 10, wherein said magnetic substrate is provided with a groove formed on said substrate surface, and said second coil is disposed in said groove.

12. A perpendicular magnetic recording head according to claim 8, wherein said magnetic substrate is provided with a groove filled with a non-magnetic material formed on said substrate surface, and said first coil is disposed on said non-magnetic material.

13. A perpendicular magnetic recording head according to claim 8, wherein said magnetic substrate is provided with a groove filled with a non-magnetic material formed on said substrate surface, and said second coil formed of a thin film is disposed on said non-magnetic material.

14. A perpendicular magnetic recording head according to claim 8, wherein a non-magnetic separating member is provided for magnetically separating said first magnetic path and said second magnetic path, said separating member being a groove filled with a non-magnetic material disposed on said substrate surface.

15. A perpendicular magnetic recording head for use with a double-layered perpendicular magnetic recording medium having a high-permeability backing layer, said magnetic recording head comprising:
a magnetic thin film pole which is disposed substantially perpendicular to an operative surface of the head, said operative surface being a surface which in operation faces said recording medium, said thin film pole including one edge exposed to said operative surface;
a pair of non-magnetic slider blocks which form a substantial portion of said operative surface, said thin film pole being disposed between said slider blocks;
a magnetic substrate having a substantially planar substrate surface which is disposed substantially parallel to said operative surface;
a magnetic linkage means having at least two end portions, one end thereof being magnetically coupled to an end portion of said thin film pole which is most remote from said operative surface, and another end thereof being magnetically coupled to said magnetic substrate at said substrate surface, said thin film pole, said linkage means and said magnetic substrate forming a first magnetic path which is substantially magnetically open;
a high-permeability transformer core means having at least two portions which magnetically couple to said magnetic substrate at said substrate surface so as to form a second magnetic path which is substantially magnetically closed;
a first thin film coil which is formed on said substrate surface and which itself is a closed electric circuit, a portion of said first coil encompassing said magnetic linkage means so as to form an electromagnetic coupling with said first magnetic path, another portion of said first coil encompassing one of said portions of the transformer core which magnetically couple to said magnetic substrate so as to form an electromagnetic coupling with said second magnetic path;
a second thin film coil formed on said substrate surface, which encompass one of said portions of the transformer core which magnetically couple to said magnetic substrate so as to form an electromagnetic coupling with said second magnetic path, said second coil having a number of turns which is larger than a number of turns of said first thin film coil in relation to said second magnetic path, said second coil being adapted to provide an output from said head.

16. A perpendicular magnetic recording head according to claim 15, wherein a number of turns N1 of the first coil which couples with said first magnetic path is equal to or greater than a number of turns N2 of said first coil which couples with said second magnetic path.

17. A perpendicular magnetic recording head according to claim 16, wherein $N1=N2=1$.

18. A perpendicular magnetic recording head according to claim 15, wherein said first coil and said second coil are wound coaxially in relation to said second magnetic path.

19. A perpendicular magnetic recording head according to claim 15, further comprising a high-permeability flux return yoke means having at least two end portions, one end thereof being magnetically coupled to said magnetic substrate at said substrate surface, and another end being faced to said operative surface of the head via said slider blocks.

20. A perpendicular magnetic recording head according to claim 15, wherein said transformer core means is formed of a magnetic thin film.

21. A perpendicular magnetic recording head according to claim 15, wherein said magnetic substrate is provided with a groove filled with a non-magnetic material on said substrate surface, and said first coil is disposed on said non-magnetic material.

22. A perpendicular magnetic recording head according to claim 15, wherein said magnetic substrate is provided with a groove filled with a non-magnetic material on said substrate surface, and said second coil is disposed on said non-magnetic material.

23. A perpendicular magnetic recording head according to claim 15, wherein a non-magnetic separating member is provided for magnetically separating said first magnetic path and said second magnetic path, said separating member being a groove provided on said substrate surface and filled with a non-magnetic material.

* * * * *